United States Patent
Li

(10) Patent No.: US 7,822,054 B2
(45) Date of Patent: Oct. 26, 2010

(54) METHOD AND SYSTEM FOR PERFORMING EDGE TO EDGE PSEUDO WIRE EMULATION OF BUNDLING INTERFACE

(75) Inventor: Guanfeng Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 153 days.

(21) Appl. No.: 12/196,926

(22) Filed: Aug. 22, 2008

(65) Prior Publication Data

US 2008/0310442 A1 Dec. 18, 2008

Related U.S. Application Data

(63) Continuation of application No. PCT/CN2006/002729, filed on Oct. 17, 2006.

(30) Foreign Application Priority Data

Feb. 24, 2006 (CN) .................. 2006 1 0058012

(51) Int. Cl.
 *H04L 12/28* (2006.01)
(52) U.S. Cl. .................. 370/419; 370/395.3; 370/437
(58) Field of Classification Search ......... 370/254–255, 370/392, 395.3, 419, 437
 See application file for complete search history.

(56) References Cited

U.S. PATENT DOCUMENTS

| | | | |
|---|---|---|---|
| 6,532,229 | B1 | 3/2003 | Johnson et al. |
| 6,563,821 | B1 * | 5/2003 | Hong et al. .................. 370/389 |
| 2005/0044262 | A1 | 2/2005 | Luo |
| 2005/0129059 | A1 | 6/2005 | Jiang et al. |
| 2006/0002423 | A1 | 1/2006 | Rembert et al. |
| 2006/0251074 | A1 * | 11/2006 | Solomon .................... 370/392 |
| 2008/0291921 | A1 * | 11/2008 | Du et al. .................. 370/395.53 |
| 2009/0300178 | A1 * | 12/2009 | Saunderson et al. ......... 709/224 |

FOREIGN PATENT DOCUMENTS

| | | |
|---|---|---|
| CN | 1714544 A | 12/2005 |
| CN | 1722726 A | 1/2006 |

OTHER PUBLICATIONS

Kang, Zi, et al.; "Link Aggregation Member Interface Status Signal; draft-zi-pwe3-link-aggr-member-status-00.txt"; Pseudo-Wire Emulation Edge-to-Edge (PWE3); IETF; Standard-Working-Draft; Internet Engineering Task Force; IETF; CH; Oct. 17, 2005; XP015043178; ISSN: 0000-0004; pp. 1-8.

Martini, Luca, et al.; "Pseudowire Setup and Maintenance using the Label Distribution Protocol; draft-ietf-pwe3-control-protocol-17.txt"; IETF; Standard-Working-Draft; Internet Engineering Task Force; IETF; CH; vol. pwe3, No. 17; Jun. 1, 2005; XP015040861; ISSN: 0000-0004; pp. 1-36.

(Continued)

*Primary Examiner*—Ayaz R Sheikh
*Assistant Examiner*—Mounir Moutaouakil

(57) ABSTRACT

A method and system for performing edge to edge pseudo wire emulation of the bundling interface in telecommunication field. The method includes: assigning the sub-channel number for the established member bundling interface and negotiating the bundling parameter; forwarding the user message through the aforementioned established bundling interface; and sending the message to the corresponding member interface based on the sub-channel number.

11 Claims, 4 Drawing Sheets

OTHER PUBLICATIONS

European Search Report for European Application No. 06804948.5, dated Feb. 24, 2009.

A. Malis, et al.; "SONET/SDH Circuit Emulation over Packet (CEP)"; Pseudo Wire Edge to Edge Emulation; Internet-Draft; draft-ietf-pwe3-sonet-11.txt; Synchronous Optical Network/Synchronous Digital Hierarchy (SONET/SDH) Circuit Emulation over Packet (CEP); May 16, 2005; pp. 1-47.

Luca Martini, et al. "Encapsulation Methods for Transport of Ethernet Over MPLS Networks"; draft-ietf-pwe3-ethernet-encap-11.txt; Nov. 2005; Network Working Group; Internet-Draft; pp. 1-21.

S. Bryant, et al.; "PWE3 Control Word for use over an MPLS PSN"; draft-ietf-pwe3-cw-06.txt; Network Working Group; Internet Draft; Oct. 2005; pp. 1-12.

Stewart Bryant, et al.; "PWE3 Architecture"; draft-ietf-pwe3-arch-07.txt; Pseudo-Wire Edge-to-Edge (PWE3) Working Group; Internet Draft; Mar. 2003; pp. 1-40.

European Office Action for European Patent Application No. 06804948.5, dated Mar. 16, 2009.

European Office action for European Patent Application No. 06804948.5, dated Dec. 22, 2009.

English translation of the Written Opinion of the International Searching Authority for International Application No. PCT/CN2006/002729, dated Dec. 27, 2006.

Multi-service Imitated Technology over IP Network; Telecom Engineering Techniques and Standardization; May 30, 2002; pp. 24-26.

International Search Report for International Application No. PCT/CN2006/002729, dated Feb. 1, 2007, and English translation thereof.

\* cited by examiner

METHOD AND SYSTEM FOR PERFORMING EDGE TO EDGE PSEUDO WIRE EMULATION OF BUNDLING INTERFACE

CROSS-REFERENCE TO RELATED APPLICATIONS

This application is a continuation of International Application No. PCT/CN2006/002729, filed Oct. 17, 2006. This application claims the benefit and priority of Chinese Application No. 200610058012.5, filed Feb. 24, 2006. The entire disclosures of each of the above applications are incorporated herein by reference.

FIELD

The disclosure relates to communication technology, and to a method and system for performing edge to edge pseudo wire emulation of the bundling interface.

BACKGROUND

This section provides background information related to the present disclosure which is not necessarily prior art.

The edge to edge pseudo wire emulation (PWE3) technology aims to connect the traditional services, such as frame relay, Asynchronous Transfer Mode (ATM), and Ethernet, and to provide service emulation over a packet switching network (PSN), thus realizing the features of the emulated original services as much as possible. The technology ensures the user service quality, and the user does not find any difference of the services. During network construction and transition, the technology provides high quality of interconnection between the user who is using the traditional services and the operator, thus protecting the original investment of the user and the operator.

The link bundling technology is to bundle the physical interfaces, thus realizing low cost and high bandwidth, for example, Ethernet bundling and Packet Over SDH (POS) interface bundling. The link bundling technology usually includes two processes: establishing a bundling interface, and adding a physical interface to the bundling interface as a member interface. The bundling interface has the same physical attributes and three-layer attributes as the independent physical interface. The bundling interface can run the corresponding link layer protocols, such as address resolution protocol (ARP) of the Ethernet, and high-speed data link control (HDLC) of the POS interface. The member interface completes the one-to-one link protocol, and the status of the bundling interface is maintained by the member interface status together.

In the Ethernet, the essence of the PWE3 technology is the point-to-point layer 2 virtual private network (VPN) technology. The link bundling process includes: first establishing point-to-point pseudo wire (PW) between provider edge devices (PEs), and then using label distribution protocol (LDP) or resource reservation protocol (RSVP) to transmit the inner label between the two ends of the PW. The outer label can be IP or label switch path (LSP). The outer label determines the PEs at the two ends of the PW, and the inner label determines the specific PW on the PE. Meanwhile, the physical features of the service are emulated over the forwarding layer, such as the ATM Quality of Server (QoS) and the alarm indication of the synchronous digital hierarchy (SDH). When the message is forwarded, the physical frame is directly encapsulated, such as the cell of the ATM and the Ethernet frame, and the protocol carried by the data frame is ignored, which applies to the point-to-point application.

The current internet engineering task force (IETF) draft has already defined the encapsulation format of the Ethernet, ATM, frame relay, synchronous optical network (SONET), and SDH emulation. But the draft can only apply to the PW establishment on one interface and the message encapsulation.

To implement PWE3 function on a router, the PW needs to be established according to a specific physical interface. The interface bundling technology is a choice for improving the physical bandwidth of the interface. The interface bundling has all the attributes of the physical interface and meanwhile improves the bandwidth. To the POS, the physical layer is the SDH and the link layer encapsulation is the point-to-point protocol (PPP). Because a PWE3 is a point-to-point application, and ignores the link protocol carried by the interface, the link layer needs to run the link aggregation control protocol (LACP) to maintain the member physical interface status for the Ethernet interface bundling on a one-to-one basis. For the member interface requiring one-to-one link negotiation of the bundling interface, the link negotiation message of the member interface is encapsulated by two-layer labels before reaching the remote end PE. Because the inner label of the PE can only distinguish the PW, the inner label cannot distinguish the corresponding member interface. The member interface cannot complete one-to-one link path negotiation across the PSN. Therefore, the bundling interface requiring negotiation between member interfaces cannot provide the PWE3 service.

SUMMARY

This section provides a general summary of the disclosure, and is not a comprehensive disclosure of its full scope or all of its features.

The present disclosure is directed to implementing one-to-one link path negotiation between member interfaces across the PSN, thus realizing a method and system for performing edge to edge pseudo wire emulation of the bundling interface.

A system for performing edge to edge pseudo wire emulation(PWE3) of a bundling interface, comprising multiple provider edge (PE) devices, wherein the PE is provided with a bundling interface creating module to create the bundling interface and, the PE further comprises:

a bundling parameter negotiating module adapted to negotiate bundling parameter of the bundling interface created at a peer of PEs, thus ensuring successful bundling interface establishment;

a sub-channel number assigning module adapted to assign a different sub-channel number for each member interface of the bundling interface, thus differentiating different member interfaces; and a message forwarding module adapted to forward messages and send the messages to a member interface of the bundling interface according to a sub-channel number.

The bundling interface creating module is adapted to add at least two member interfaces to the bundling interface to create the bundling interface, and to create a point-to-point pseudo wire between the bundling interfaces of the peer of PEs.

The bundling parameter negotiating module is adapted to distribute a label and to negotiate the interface parameter employing a type-length-value (TLV) of label distribution protocol (LDP).

The negotiation parameter of the LDP comprises a type field which indicates bundling ability, and a length field.

The sub-channel number assigning module encapsulates the sub-channel number in a Control Word of the PWE3.

A method for performing edge to edge pseudo wire emulation(PWE3) of a bundling interface, comprising:

A. assigning a sub-channel number for a established member interface of a bundling interface, and negotiating bundling parameter to ensure successful bundling interface establishment;

B. forwarding messages through the established bundling interface, and sending the message to a corresponding member interface of the bundling interface based on a sub-channel number.

The sub-channel number of the member bundling interface at two ends of a pseudo wire(PW) is mapping one to one.

The process of negotiating the bundling parameter further comprises:

if one of the two ends of the PW does not support bundling ability, the PW cannot be established normally; a Control Word of the mapping message transmitted by label distribution protocol(LDP) between the two ends of the PW is set to 1.

The B includes:

encapsulating a sub-channel number into a Control Word, encapsulating the Control Word, and two-layer labels into the messages of a member interface;

sending the message to a remote PE which is the two ends of the PW;

finding, by the remote PE, a corresponding PW according to the inner label, obtaining the sub-channel number from the Control Word; and comparing, by the remote PE, the sub-channel number with its local sub-channel numbers; when a local sub-channel with the same sub-channel number exists, sending the message to a member interface corresponding to the local sub-channel.

The method further includes:

discarding, by the remote PE, the message when the local sub-channel number does not exist.

The aforementioned generally indicates that the disclosure realizes one-to-one link path negotiation among the member interfaces of the bundling interface through assigning sub-channel number to the member interface and by using the LDP negotiation bundling parameter, thus ensuring the bundling link path feasibility. This disclosure is easy to be implemented and has strong scalability.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

The disclosure includes a method and system for performing edge to edge pseudo wire emulation of the bundling interface. The negotiation of the bundling ability is completed through the LDP. The sub-channel number is assigned to the member interface of the bundling interface, thus realizing one-to-one link negotiation of the member interface across the PSN.

Figure 1:
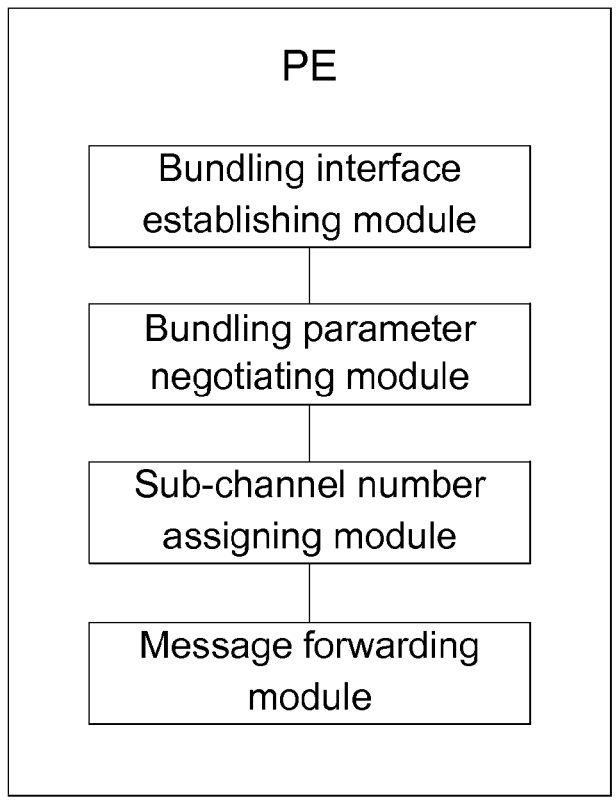
FIG. 1 is a simplified diagram showing modules of a system according to an embodiment.
Figure 2:
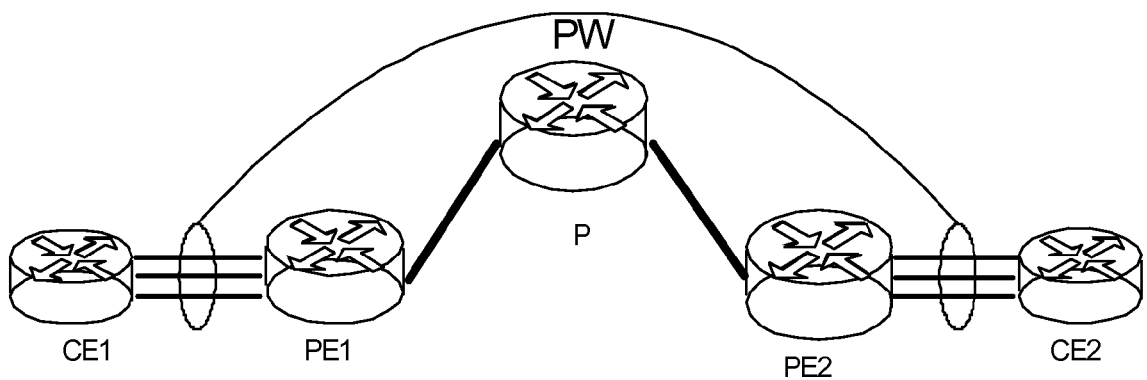
FIG. 2 is a simplified schematic diagram showing the application of the PWE3 on a bundling interface, in accordance with an embodiment.

The disclosure includes a system for performing edge to edge pseudo wire emulation of the bundling interface. In an embodiment, as shown in FIG. 1, the PE side is provided with, a bundling interface establishing module, a bundling parameter negotiating module, a sub-channel number assigning module, and a message forwarding module. The bundling interface establishing module is adapted to add at least two member interfaces to a bundling interface on the PE, thus creating the bundling interface, and creating a point-to-point PW on the bundling interface. The bundling parameter negotiating module is adapted to negotiate whether two ends have a bundling ability. FIG. 2 is a schematic diagram showing the application of the PWE3 on the bundling interface. The LDP can be adapted to complete the assignment of the labels and the negotiation of the interface parameter. For example, a Sub-TLV (TLV: Type Length Value) is employed for the negotiation as follows:

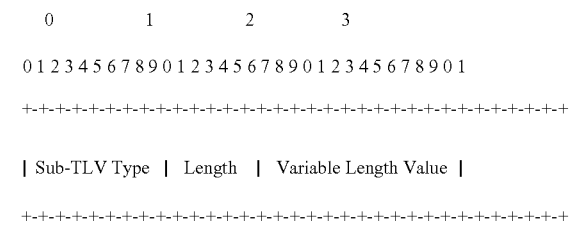

The Type field on the bundling Sub-TLV is a bundling ability type, and the Length field is 0.

The sub-channel number assigning module is adapted to assign a different sub-channel number to each member interface of the bundling interface, thus differentiating different member interfaces. The sub-channel number can be carried in the Control Word of the PWE3. For example, the Ethernet interfaces bundling employs a format of the Control Word as follows:

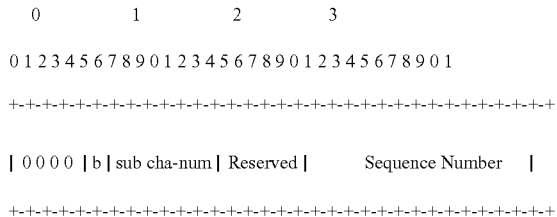

When b in the aforementioned Control Word is 1, it may indicate a sub-channel. The sub cha-num indicates the sub-channel number, and the Reserved field is 0.

The following format of the Control Word is applied to a POS interfaces bundling:

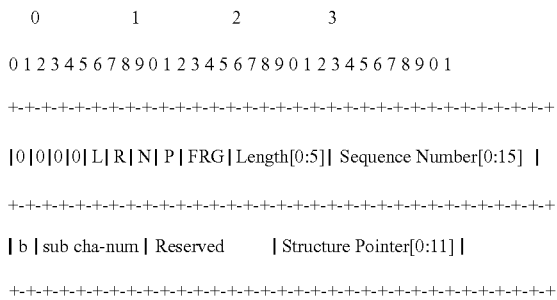

When b in the aforementioned Control Word is 1, it may indicate a sub-channel. The sub cha-num indicates the sub-channel number, and the Reserved field is 0.

The sub-channel number of a member interface of a bundling interface at two ends of the PW is one-to-one mapping.

The message forwarding module is adapted to forward messages. When the PE sends messages to a remote PE through a PSN, the message forwarding module encapsulates a sub-channel number into the Control Word, forward the messages to a remote PE through a PSN; When the PE sends messages to its CE, the message forwarding module takes out the sub-channel number and compares the sub-channel number with its local sub-channel numbers, then forwards the message to the corresponding member interface.

Figure 3:
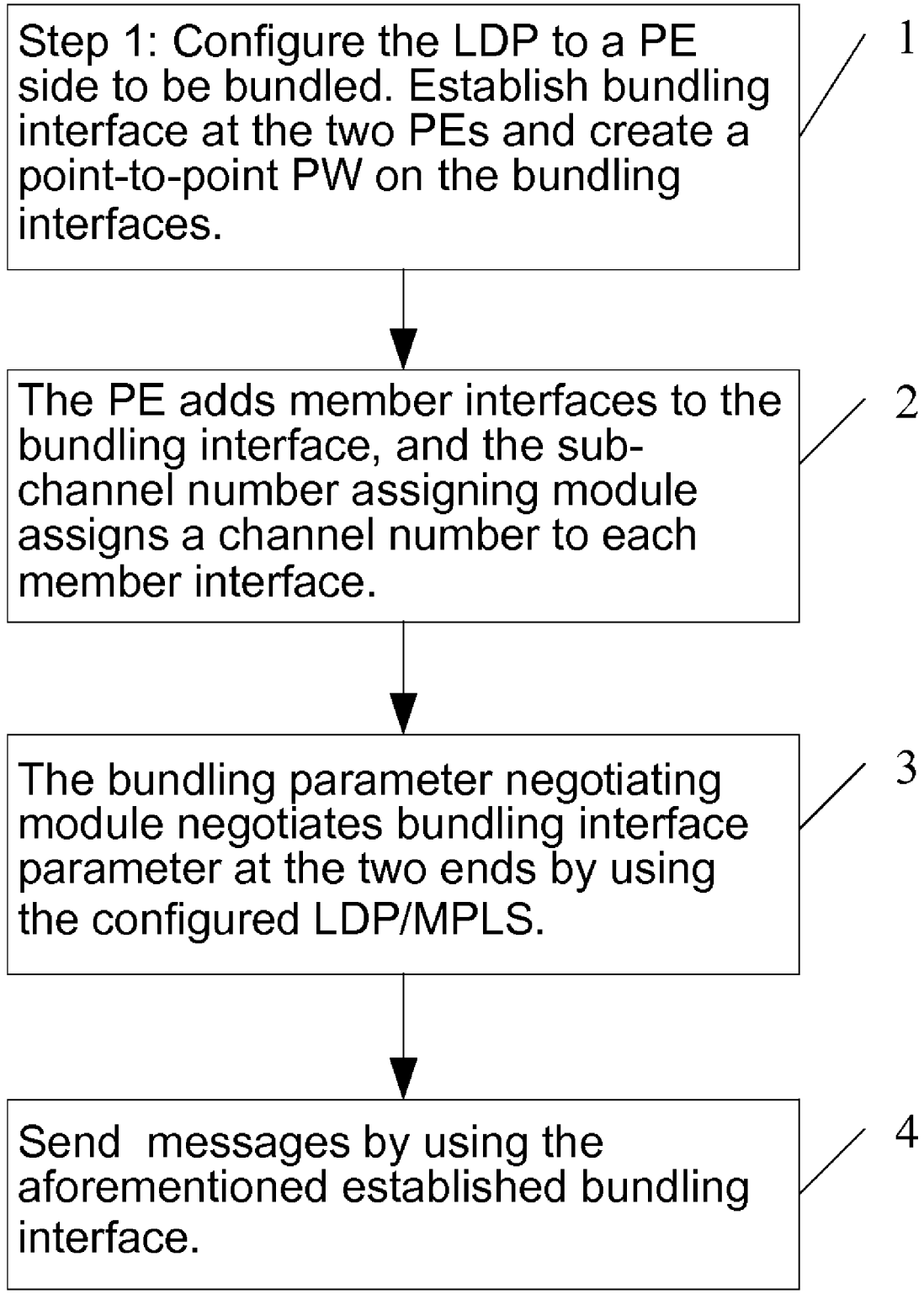
FIG. 3 is a simplified flowchart showing the operation process of a method according to an embodiment.

The disclosure includes a method for performing edge to edge pseudo wire emulation of the bundling interface. As shown in FIG. 3, the method includes the following blocks:

Block 1: The LDP is configured to the PE side to be bundled. A bundling interface is established at the two PEs and a point-to-point PW is created on the bundling interface.

Block 2: The PE adds a member interface to the bundling interface, and the sub-channel number assigning module assigns a sub-channel number to each member interface. During the assignment process, the sub-channel number of the member interface of the bundling interface at the two ends of the PW is one-to-one mapping.

Block 3: The bundling parameter negotiating module uses the configured LDP to negotiate the bundling parameter at the two ends.

Figure 4:
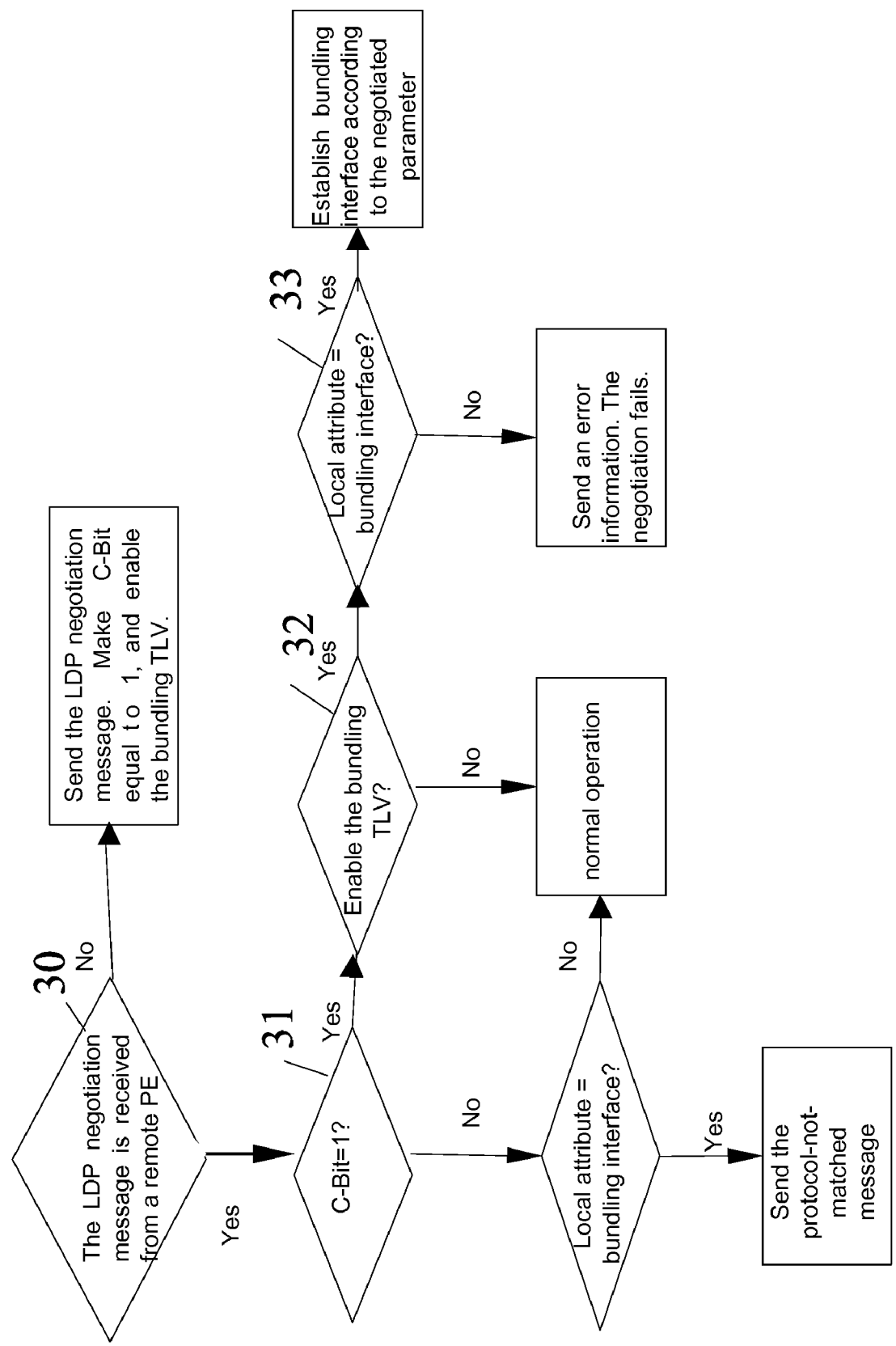
FIG. 4 is a simplified flowchart showing the bundling parameter negotiation process of a method according to an embodiment.

The bundling parameter negotiating module can use the LDP, and use the Sub-TLV to negotiate the bundling interface parameter. If one end does not support the bundling ability, the PW cannot be established. The Control Word (C-Bit) in the mapping message sent by the LDP two ends PW is equal to 1. As shown in FIG. 4, the negotiation process includes:

Block 30: When the PE is configured with the LDP, and is established with the bundling interface PW, the PE judges whether it receives the LDP negotiation message from its remote PE.

If the PE does not receive the LDP negotiation message, the PE sends the LDP negotiation message to the remote PE and sets C-Bit=1, that is, the sent LDP negotiation message contains the Control Word, and enables the bundling TLV.

Block 31: If the PE receives a negotiation message from the remote PE, the PE judges whether C-Bit in the message is equal to 1, that is, the PE judges whether the negotiation message contains the Control Word.

If the C-Bit is not equal to 1, the PE judges whether its local interface is the bundling interface according to its local attributes. If yes, the PE sends a protocol-not-matched message to the remote PE, indicating unsuccessful negotiation. If no, the PE assigns labels locally and sends the labels to the remote PE through a label mapping message.

Block 32: If the C-Bit is 1, the PE judges whether the bundling TLV is enabled.

If not enabled, the PE assigns labels locally and sends the labels to the remote PE through a label mapping message.

Block 33: If the bundling TLV is enabled, the PE judges whether its local interface is a bundling interface according to its local attributes. If yes, the two ends PEs can establish the bundling interface according to the current negotiation parameter. If not, the PE sends error information to the remote PE.

The process of LDP negotiating bundling interface parameter is complete.

Block 4: The message forwarding module sends messages by using the aforementioned bundling interface.

Figure 5:
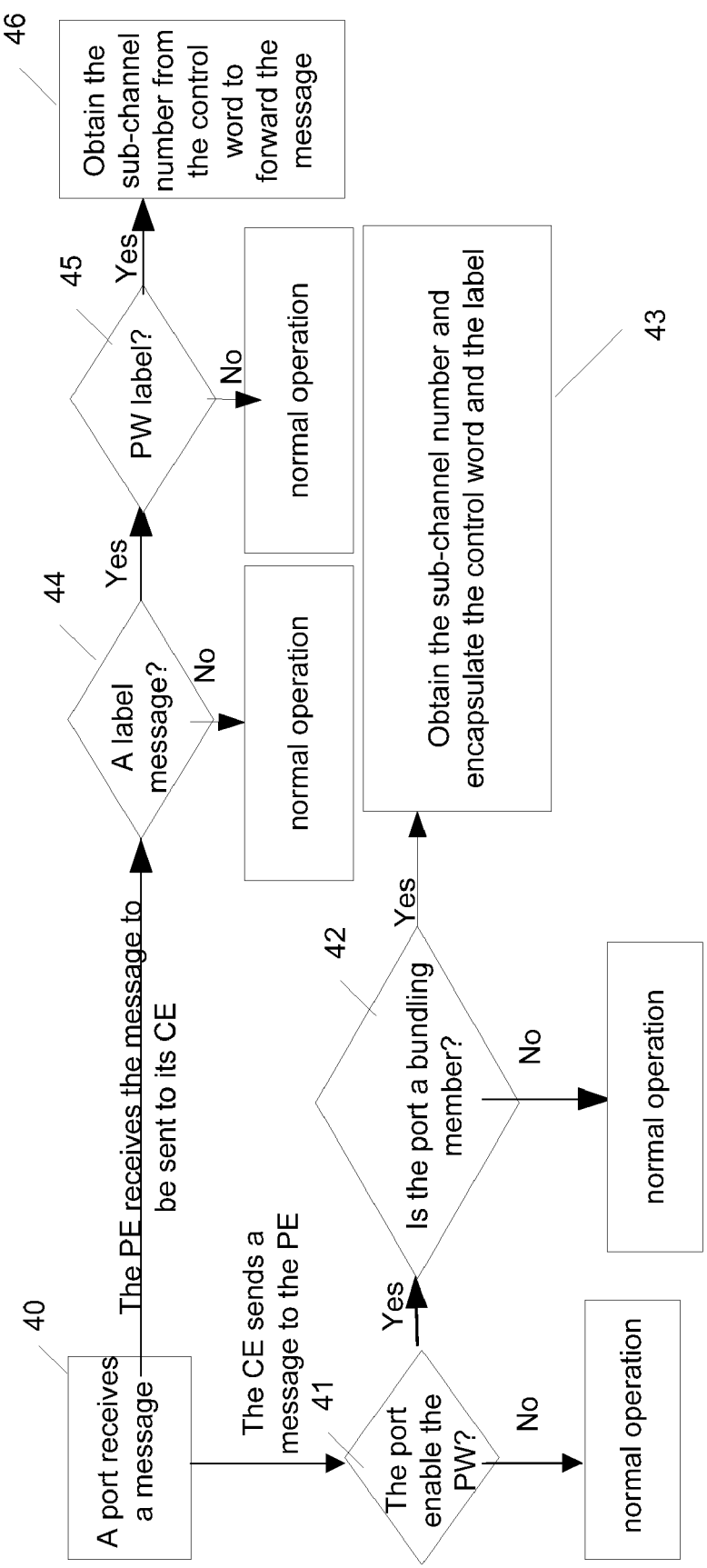
FIG. 5 is a simplified flowchart showing a message forwarding process of a method according to an embodiment.

The forwarding plane receives a message from a member interface. Firstly, the message forwarding module obtains the sub-channel number of the member, and encapsulates the sub-channel number to a Control Word. Then the message received form the member interface is encapsulated with the Control Word and two-layer labels. The encapsulated message reaches the remote PE through the PSN. The message forwarding module of the remote PE finds a corresponding PW through its inner label, obtains a sub-channel number from the Control Word, and compares the sub-channel number with its local sub-channel numbers. If the local sub-channel with the same sub-channel number exists, the module sends a user message to the corresponding member interface, thus realizing one-to-one link path negotiation of the bundling member. FIG. 5 shows the specific operation process, including:

Block 40: A port receives a message.

The message received by the port in this example includes: the PE receiving the message from a customer edge device (CE) for encapsulation, and the PE sending the received message from its remote PE to its CE.

Block 41: When the PE receives the message sent from the CE, it judges whether the port enables the PW. If not enabled, the PE classifies the message according to the type of the port.

Block 42: If enabled, the PE judges whether the port is a member interface of bundling interface. If not, the PE encapsulates two-layer labels for forwarding.

Block 43: If the port is a member interface of bundling interface, the PE obtains the sub-channel number, encapsulates the Control Word and the label, and forwards the encapsulated message to the remote PE.

Block 44: When the PE receives the message to be sent to its CE, the PE judges whether the message is a label message. If not, the PE queries the IP forward table to forward the message.

Block 45: If the message is a label message, the PE judges whether the label is a PW label. If not, the PE performs corresponding processes according to the label.

Block 46: If the label is a PW label, the PE obtains a sub-channel number from the Control Word of the message, and compares the sub-channel number with its local sub-channel numbers. If the local sub-channel with the same number exists, the PE transmits the message to a member interface corresponding to the sub-channel number. If the sub-channel does not exist, the PE discards the message.

In a word, this disclosure realizes one-to-one link path negotiation of a bundling member interface through assigning sub-channel number to the member interface and using the LDP to negotiate the bundling parameter, thus ensuring the link bundling feasibility.

While the above disclosure describes various embodiments, the protection scope disclosure is not limited by the above. The change or replacement that can be thought of by any technical personnel who are familiar with this technical domain falls in the protection scope of this disclosure.

What is claimed is:

1. A Provider Edge device (PE) for performing edge to edge pseudo wire emulation (PWE3) of a bundling interface, comprising:
    a bundling interface creating module at the PE, adapted to create the bundling interface at the PE and create a point-to-point pseudo wire (PW) on the bundling interface, wherein the bundling interface comprises at least two member interfaces;
    a sub-channel number assigning module at the PE, adapted to assign a different sub-channel number for each member interface of the bundling interface, thus differentiating different member interfaces, wherein the sub-channel number of the member interface of the bundling interface at two ends of the PW is one to one mapping;
    a bundling parameter negotiating module at the PE, adapted to negotiate bundling parameter to realize one-to-one link negotiation of the member interfaces across a packet switching network (PSN), wherein the bundling parameter comprises a bundling ability type indicating whether the PE or its remote PE has bundling ability; and
    a message forwarding module at the PE, adapted to obtain the sub-channel number of the member interface of the bundling interface, encapsulate the sub-channel number into a Control Word, encapsulate a message received from the member interface with the Control Word, an inner label and an outer label, and forward the encapsulated message to the remote PE, wherein the inner label determines the PW and the outer label determines PEs at the two ends of the PW.

2. The PE according to claim 1, wherein the bundling parameter negotiating module at the PE, is adapted to distribute a label and to negotiate the bundling parameter employing a type-length-value (TLV) of label distribution protocol (LDP).

3. The PE according to claim 2, wherein the negotiation parameter of the LDP comprises a type field which indicates the bundling ability, and a length field.

4. A system for performing edge to edge pseudo wire emulation (PWE3) of a bundling interface, comprising:
    a Provider Edge device (PE) for performing edge to edge pseudo wire emulation (PWE3) of a bundling interface including:
        a bundling interface creating module at the PE, adapted to create the bundling interface at the PE and create a point-to-point pseudo wire (PW) on the bundling interface, wherein the bundling interface comprises at least two member interfaces;
        a sub-channel number assigning module at the PE, adapted to assign a different sub-channel number for each member interface of the bundling interface, thus differentiating different member interfaces, wherein the sub-channel number of the member interface of the bundling interface at two ends of the PW is one to one mapping;
        a bundling parameter negotiating module at the PE, adapted to negotiate bundling parameter to realize one-to-one link negotiation of the member interfaces across a packet switching network (PSN), wherein the bundling parameter comprises a bundling ability type indicating whether the PE or its remote PE has bundling ability; and
        a message forwarding module at the PE, adapted to obtain the sub-channel number of the member interface of the bundling interface, encapsulate the sub-channel number into a Control Word, encapsulate a message received from the member interface with the Control Word, an inner label and an outer label, and forward the encapsulated message to the remote PE, wherein the inner label determines the PW and the outer label determines PEs at the two ends of the PW; and
    at least one peer of the Provider Edge device.

5. The PE according to claim 4, wherein the bundling parameter negotiating module at the PE, is adapted to distribute a label and to negotiate the bundling parameter employing a type-length-value (TLV) of label distribution protocol (LDP).

6. The PE according to claim 5, wherein the negotiation parameter of the LDP comprises a type field which indicates the bundling ability, and a length field.

7. A method for performing edge to edge pseudo wire emulation (PWE3) of bundling interface, comprising:
    creating a bundling interface at a Provider Edge device (PE);
    creating a point-to-point pseudo wire (PW) on the bundling interface, wherein the bundling interface comprises at least two member interfaces;
    assigning a sub-channel number to each member interface of the bundling interface, wherein the sub-channel number of the member interface of the bundling interface at two ends of the PW is one to one mapping;
    negotiating bundling parameter to realize one-to-one link negotiation of the member interfaces across a packet switching network (PSN), wherein the bundling parameter comprises a bundling ability type indicating whether the PE or its remote PE has bundling ability;
    encapsulating the sub-channel number of the member interface of the bundling interface into a first Control Word after receiving a message from a Customer Edge device (CE) through the member interface;
    encapsulating the first Control Work, an inner label, and an outer label into the message; and
    sending the encapsulated message to the remote PE so that the remote PE transmits the message to a member interface of a bundling interface at the remote PE corresponding to the sub-channel number.

8. The method of claim 7, wherein the process of negotiating the bundling parameter comprises:
    judging, by the PE, whether the PE receives a first LDP negotiation message from the remote PE;
    sending, by the PE, a second LDP negotiation message containing a second Control Word to the remote PE and enabling a first bundling type length value (TLV) if the PE does not receive the first LDP negotiation message;

judging whether the first negotiation message containing a third Control Word if the PE receives the first LDP negotiation message;

judging whether a second bundling TLV is enabled if the first negotiation message contains the third Control Word; and judging whether a local interface of the PE is a bundling interface according to local attributes if the second TLV is enabled.

9. A method for performing edge to edge pseudo wire emulation (PWE3) of bundling interface, comprising:

creating a bundling interface at a Provider Edge device (PE);

creating a point-to-point pseudo wire (PW) on the bundling interface, wherein the bundling interface comprises at least two member interfaces assigning a sub-channel number to each member interface of the bundling interface, wherein the sub-channel number of the member interface of the bundling interface at two ends of the PW is one to one mapping;

negotiating bundling parameter to realize one-to-one link negotiation of the member interfaces across a packet switching network (PSN), wherein the bundling parameter comprises a bundling ability type indicating whether the PE or its remote PE has bundling ability;

obtaining a corresponding pseudo wire (PW) according to an inner label;

obtaining the sub-channel number from a first Control Word upon receiving a message from a remote Provider Edge device (PE) through a member interface, the member interface is a member of the bundling interface;

comparing the sub-channel number with its local sub-channel numbers; and sending the message to its customer edge (CE) through the member interface corresponding to the sub-channel number when a local sub-channel with the same sub-channel number exists.

10. The method according to claim 9, further comprising:

discarding, by the PE, the message when a local sub-channel with the same sub-channel number does not exist.

11. The method of claim 9, wherein the process of negotiating the bundling parameter comprises:

judging, by the PE, whether the PE received a first LDP negotiating message from the remote PE;

sending, by the PE, a second LDP negotiation message containing a second Control Word to the remote PE and enabling a first bundling type length value (TLV) if the PE does not receive the first LDP negotiation message;

judging whether the first negotiation message containing a third Control Word if the PE receives the first LDP negotiation message;

judging whether a second bundling TLV is enabled if the first negotiation message contains the third Control Word; and judging whether a local interface of the PE is a bundling interface according to local attributes if the second TLV is enabled.

* * * * *

UNITED STATES PATENT AND TRADEMARK OFFICE
CERTIFICATE OF CORRECTION

PATENT NO. : 7,822,054 B2
APPLICATION NO. : 12/196926
DATED : October 26, 2010
INVENTOR(S) : Guanfeng Li Page 1 of 1

It is certified that error appears in the above-identified patent and that said Letters Patent is hereby corrected as shown below:

In the Claims:

Column 8, Line 54, Claim 7 (Amendment dated 6/21/10; Page 5, Line 17, Claim 11): "Work" should be --Word--.

Column 10, Line 15, Claim 11 (Amendment dated 6/21/10; Page 9, Line 17, Page 22): "negotiating" should be --negotiation--.

Signed and Sealed this
Eighteenth Day of January, 2011

David J. Kappos
*Director of the United States Patent and Trademark Office*